April 15, 1952   T. C. MANN   2,593,324
CONVEYER CHAIN
Filed March 25, 1949   2 SHEETS—SHEET 1
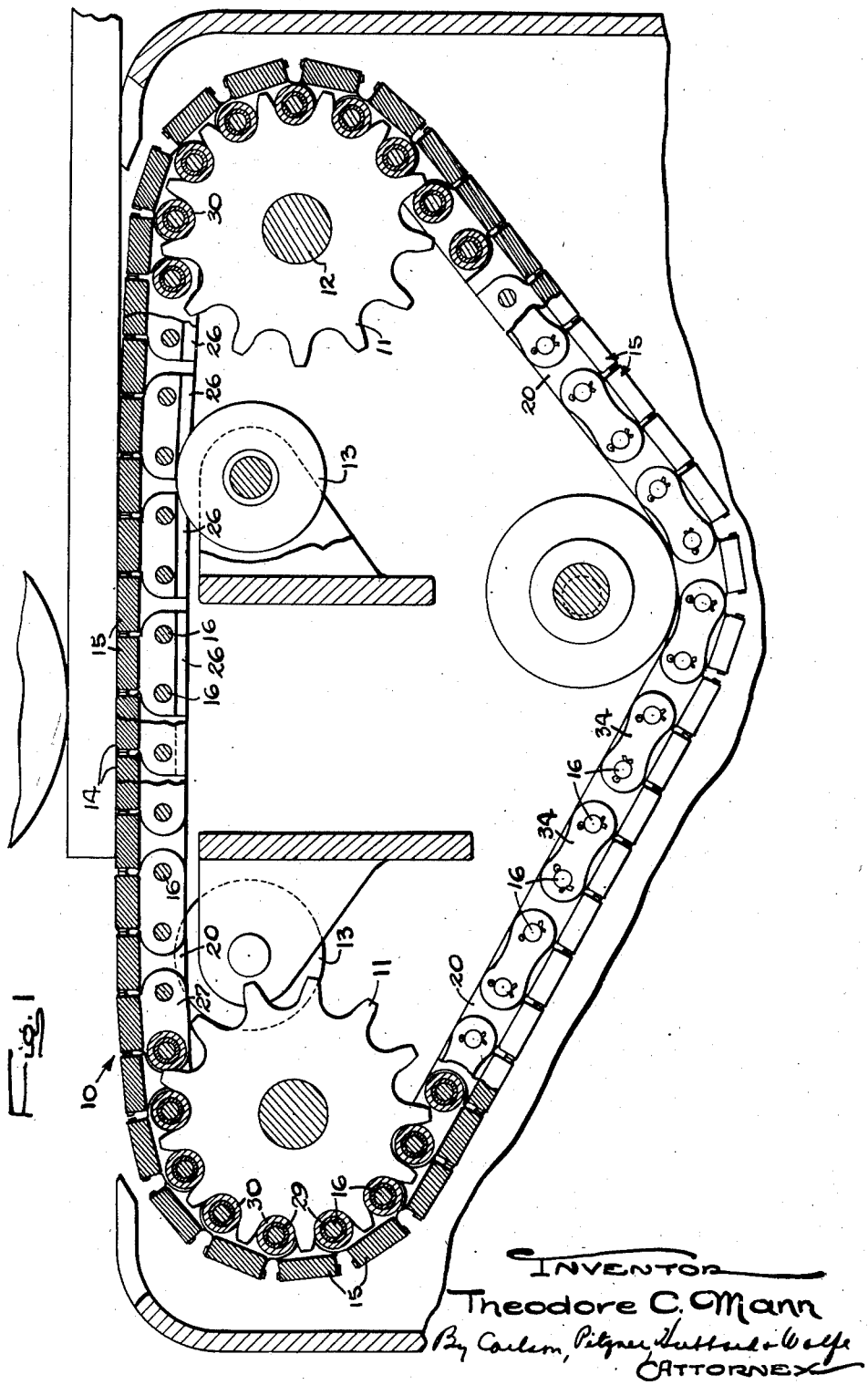
INVENTOR
Theodore C. Mann
By Carlson, Pitzner, Hubbard & Wolfe
ATTORNEYS April 15, 1952  T. C. MANN  2,593,324
CONVEYER CHAIN
Filed March 25, 1949  2 SHEETS—SHEET 2
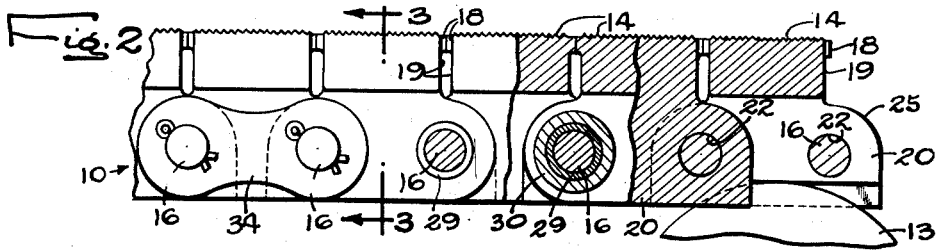
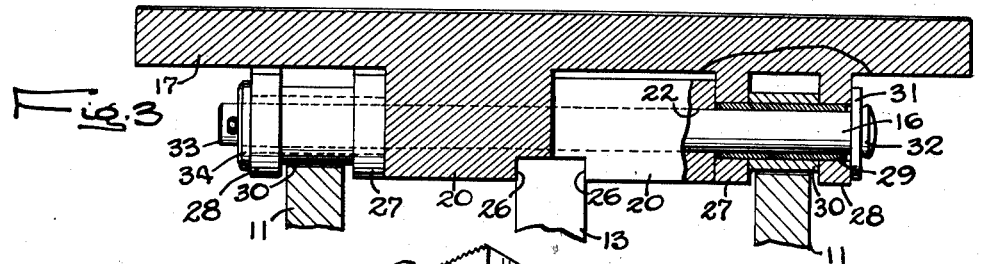
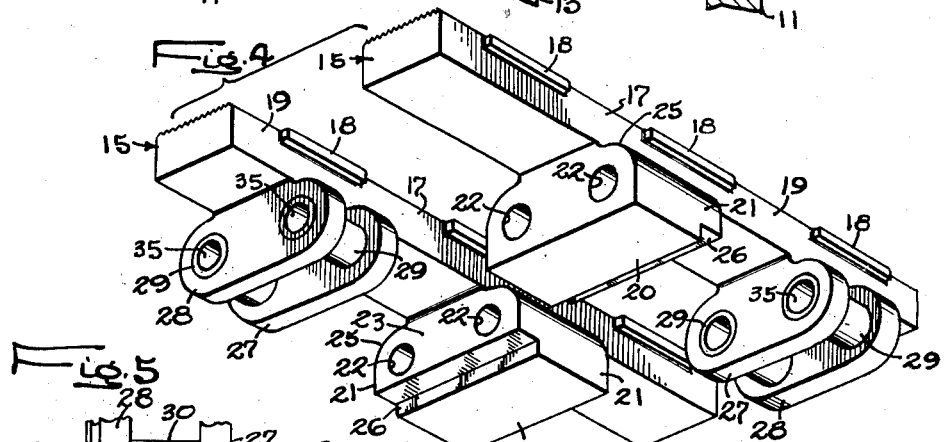
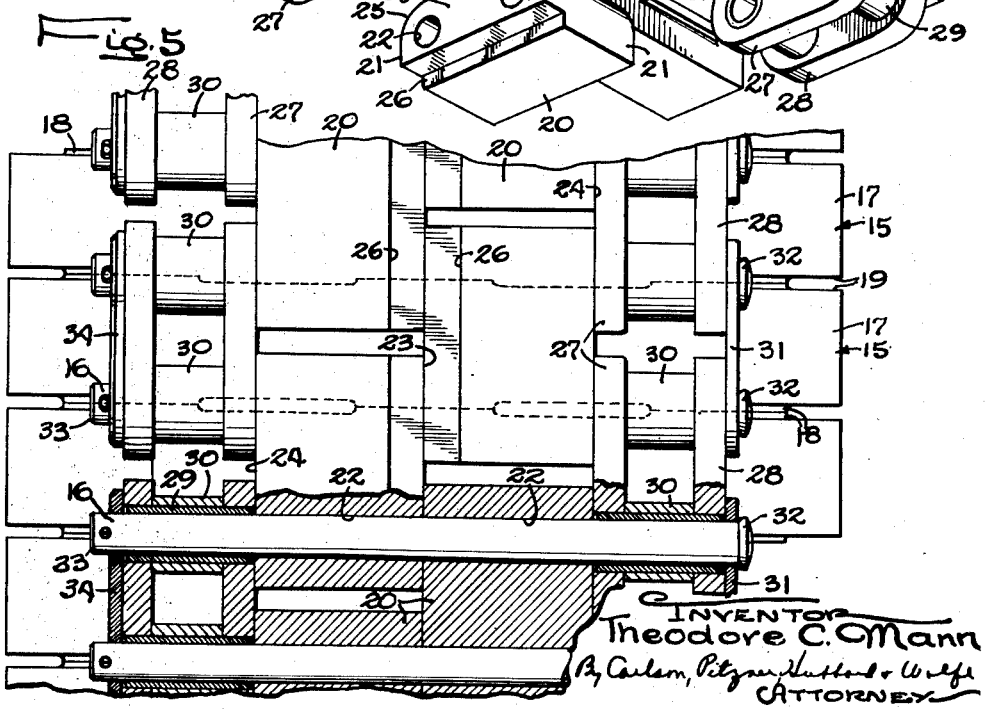
INVENTOR
Theodore C. Mann
By Carlson, Pitzner, Hubbard & Wolfe
ATTORNEY Patented Apr. 15, 1952

2,593,324

UNITED STATES PATENT OFFICE 2,593,324

CONVEYER CHAIN

Theodore C. Mann, Beloit, Wis., assignor to Ekstrom-Carlson & Co., Rockford, Ill., a corporation of Illinois Application March 25, 1949, Serial No. 83,455

7 Claims. (Cl. 198—195)

1

This invention pertains to endless chain mechanisms for feeding workpieces to be operated upon to certain types of operating machines such as molders, planers, or the like, and has more particular reference to the links in endless chains of the type which support the workpieces on a straight run or generally continuous flat surface. Heretofore, in chains of this type, each link has been formed along opposite side edges with projecting lugs extending throughout the length of the link with lugs on opposite sides staggered relative to each other so that the lugs on adjacent sides of adjacent links will interlock with each other for the extension of pivot pins therethrough.

One object of the present invention is to simplify the construction of the links by reducing the number of lugs on each link and the number of operations required in machining the links.

Another object is to effect such simplification by forming and arranging the lugs on duplicate links in such manner that the links may be reversed end for end relative to each other and pivotally connected at their adjacent edges to form the chain.

A more detailed object is to form the lugs projecting from opposite sides of the link in alinement with each other instead of in staggered relation and to locate the lugs adjacent the center and only one end of the link.

A further object is to achieve reversibility of adjacent links while at the same time providing a groove for engaging the roller by which the chain is guided.

Other objects and advantages of the invention will become apparent from the following detailed description taken in connection with the accompanying drawings, in which Figure 1 is a fragmentary side elevation of the feeding mechanism embodying the present invention.

Fig. 2 is a fragmentary side elevation of the feed chain.

Fig. 3 is a fragmentary section taken along the line 3—3 of Fig. 2.

Fig. 4 is a perspective view of two links.

Fig. 5 is a fragmentary plan view of a portion of the chain.

In the drawings, the invention is shown embodied for purposes of illustration in an endless chain 10 supported at opposite ends by a pair of sprockets 11 on power driven shafts 12 and having an upper straight run supported by guide rolls 13 and providing a generally flat surface

2

14 for carrying workpieces such as wood to a cutter or the like.

Generally stated, the chain is composed of a series of links 15 each of which is generally flat on one side and rigid on the other side with a block and one or more lugs spaced along the link in a novel manner to interfit at their ends with the blocks and lugs of the next adjacent link which, in accordance with the present invention, is reversed or turned end for end with respect to the first link. The interfitting ends of the blocks and lugs of adjacent links are pivotally connected by elongated pins 16.

Now considering the construction of the individual links more in detail, the link proper comprises an elongated flat rectangular bar 17 having a length equal to several times its width and to the desired width of the chain surface 14. One side of the bar is generally flat to form the work supporting surface 14 which may, if desired, be roughened or serrated longitudinally to better grip the work. Narrow flanges 18 are formed along opposite side edges 19 of the bar for abutting engagement with similar flanges on adjacent links to assist in preventing bending of the chain along the straight run.

Projecting rigidly from the other side of the bar 17 is a rectangular block 20 wider than the bar and preferably cast integral therewith. Herein the block is somewhat wider than it is long and the ends 21 thereof form lugs which project equidistantly beyond the opposite side edges 19 of the bar 17. Parallel holes 22 for receiving the pivot pins 16 are drilled through the block ends and disposed beneath the bar edges 19 and parallel thereto. The other or side surfaces 23 and 24 of the block are parallel and extend transversely of the bar 17. The block is offset longitudinally to the left as viewed in Fig. 3 from the longitudinal center of the bar and toward one end thereof with the surface 23 of the block disposed adjacent the bar center. To permit bending of the chain around the sprockets 11, the corners of the projecting end portions 21 of the block adjacent the bar 17 are rounded off as indicated at 25 thereby avoiding interference between the block on one link and the underside of the bar 17 of the adjacent link.

Surfaces are formed on each block 20 for engagement with both the periphery and the sides of the guide rolls 13 to enable the latter to support the straight run of the chain and also hold it against edgewise displacement. For this purpose, the transverse edge of the block adjacent the bar center is undercut throughout its length to form a right angular slot 26 paralleling the block surface 23. When two links with the blocks thus located are reversed end for end relative to each other and placed side by side, the two blocks will lie side by side in staggered relation to each other and the slots 26 will cooperate to form a groove corresponding in width to the guide roll 13 and adapted to receive the latter as the chain is advanced.

Adjacent the other end of the bar 17 are one or more elongated lugs 27 and 28 rigid with and extending transversely of the bar with opposite end portions thereof alined with each other and projecting equidistantly beyond the opposite edges 19 of the bar. These lugs are spaced longitudinally of the bar to receive the teeth of the sprockets 11 between them and are apertured in alinement with the block holes 22 to receive the pins 16 extending therethrough. In this instance, the pins are journaled in bushings 29 spanning the lugs and pressed into the holes in the end portions of the lugs. Rollers 30 are journaled on the bushings for meshing engagement with the sprocket teeth. By using bushings instead of mounting the rollers directly on the pins 16, better distribution of wear is achieved and the service life of the pins is correspondingly prolonged.

To hold the links positively against endwise shifting relative to each other, the lug 27 is positioned to fit closely adjacent the surface 24 on the block of the adjacent link. This is accomplished by spacing the machined inner surface of the lug 27 from the surface 23 of the block 20 a distance equal to the length of the block or, in other words, to the longitudinal spacing of the block surfaces 23 and 24.

It will be observed from the foregoing that the desired reversibility of the chain links is achieved as above described through the location of the block 20 to one side of the bar center, the spacing of the block and the lug 27, and also by forming the lugs 27 and 28 for supporting the chain rollers 30 at only one end of the bar 17. Thus, the other end of the bar beyond the block is left flat and entirely free of projections to provide a space into which the projecting ends of the lugs 27 and 28 of adjacent reversed links can be moved. In assembling the chain, the adjacent links are reversed end for end relative to each other and placed side by side as shown in Fig. 3 so that the lugs 27 and 28 of the adjacent links are disposed at opposite edges of the chain and the block on one link is alined with the recess between the lugs and blocks on the next adjacent link. Also, the lugs on one link are disposed opposite the flat or free portion of the end of the next adjacent link beyond the block.

Now, when the bars 17 are moved edgewise toward each other to bring the flanges 18 into abutment with each other, the block 20 on one bar enters into the recess on the next adjacent bar, and the lugs 27 and 28 on the first bar project partially across the free end portion of the adjacent bar. Thus, as shown in Fig. 4, the blocks and lugs of adjacent links are staggered relative to each other, and the blocks and lugs of alternate links are alined with each other. The adjacent end portions of the surfaces 23 and 24 on the block of one link overlap and fit against the adjacent end portions of the surface 23 on the block and the inner surface of the lug 27 on the next adjacent link.

In this position, the holes 22 in the interfitting block ends and the bushing holes 35 are alined with each other so that the pins 16 can be forced therethrough. Preparatory to inserting the pins, thin connector links 31 are held against the outside surfaces of the lugs 28 on alternating links and along one edge of the chain. Then, the pins are forced through the connectors and the holes 22 and 35 until headed end portions 32 of the pins abut against the connector links. The other ends 33 of each pair of pins are joined by another connector link 34 driven thereon and are apertured to receive cotter keys which, together with the headed end portions 32, hold the pins in place. Through the use of the connector links wear on the cotter keys is avoided.

By making all of the chain links of the same construction and obtaining interlocking of the projecting lugs by reversing the adjacent links end for end, several important advantages are achieved. A minimum number of lugs is required on each link and the cost of machining the sides of the lugs is reduced to a minimum. This is because the corresponding lugs projecting from opposite sides of the bar are alined with each other thereby enabling these sides to be machined in a single operation. In view of the small number of lugs required, these may be wide and formed with side surfaces of large areas, all of which contribute to the ruggedness to the chain as a whole.

I claim as my invention:

1. A link for a feed chain comprising an elongated flat rectangular bar providing a generally flat work supporting surface on one side, a rectangular block wider than said bar and projecting rigidly from the other side of the bar with two of its ends projecting equidistantly beyond opposite side edges of the bar and having longitudinal parallel holes disposed beneath the bar and paralleling the latter, said block being offset longitudinally from the longitudinal center of said bar toward one end of the latter and having parallel end surfaces one of which is disposed adjacent said center, the transverse edge of said block adjacent said bar center being undercut throughout its length to provide a guide surface paralleling said end surfaces, and a flat lug rigid with and extending transversely of said bar adjacent the other end thereof with the opposite ends of the lug projecting equidistantly from said opposite side edges and formed with holes alined with said block holes, the length of said block being substantially equal to the spacing of said lug from the block whereby to permit the lug and blocks of adjacent links to interfit with each other when the bars of such links are disposed side by side but in reversed relation.

2. A link for a feed chain comprising an elongated flat rectangular bar providing a generally flat work supporting surface on one side, a rectangular block wider than said bar and projecting rigidly from the other side of the bar with two of its ends projecting equidistantly beyond opposite side edges of the bar and having longitudinal parallel holes disposed beneath the bar and paralleling the latter, said block being offset longitudinally from the longitudinal center of said bar toward one end of the latter and having parallel end surfaces one of which is disposed adjacent said center, the transverse edge of said block adjacent said bar center being undercut throughout its length to provide a guide surface paralleling said end surfaces, and a lug rigid with and extending transversely of said bar adjacent the other end thereof with the opposite ends of the lug projecting equidistantly from said opposite side edges and formed with holes alined with said block holes, said lug and block being spaced apart to interfit with the lug and block on adjacent links when the bars of such links are disposed side by side but in reversed relation.

3. A link for a feed chain comprising an elongated bar, a block rigid with one side of the bar and having ends projecting equidistantly from opposite side edges of the bar and having holes therethrough paralleling the bar edges, said block being disposed adjacent but offset longitudinally from the longitudinal center of said bar toward one end of the latter, the transverse edge of said block adjacent said bar center being formed with a groove of right angular cross section, and a lug rigid with and extending transversely of said bar near the other end thereof with the opposite ends of the lug projecting equidistantly from said side edges and having holes therethrough alined with said first holes, the spacing of said lug and said block being substantially equal to the spacing of the sides of said block whereby the end of said block on one link will be received between the lug and the block of a reversed adjacent link.

4. A feed chain comprising, a series of elongated rectangular bars disposed in edge to edge relation, blocks wider than said bars rigid with one side of the bars and projecting from opposite edges thereof with the block on one bar offset longitudinally from the center of the bar in one direction and the block on the adjacent bar offset in the other direction so that adjacent projecting ends of the blocks interfit with each other in overlapping relation the adjacent overlapping edges of the blocks being undercut to form a guide groove extending transversely of the bars at the centers thereof, a lug rigid with each of the alternate bars at one edge of the chain projecting transversely across the bars and lying adjacent the outer side of the alined blocks of the two adjacent bars, a similar lug rigid with each of the intervening bars at the other edge of the chain and lying adjacent the outer ends of the alined blocks of the adjacent bars, and pivot pins extending along opposite sides of each bar and each projecting through alined holes in the overlapping lugs and blocks of the adjacent bars.

5. A link for a feed chain comprising an elongated bar providing a work supporting surface on one side thereof, a block projecting rigidly from the opposite side of said bar with two of its ends projecting equidistantly beyond opposite longitudinal side edges of the bar and having holes therein paralleling the latter and adapted to receive pivot pins to connect the link to adjacent links, said block being disposed adjacent but offset longitudinally from the longitudinal center of the bar toward one end of the latter and having a lateral surface adapted to cooperate with a guide, a pair of parallel lugs rigid with and extending transversely of the bar adjacent its other end with the opposite ends of each lug projecting equidistantly beyond said opposite side edges and formed with holes aline with said block holes, said lugs being spaced apart longitudinally of said bar to receive the teeth of a sprocket between them with the inner lug spaced from said bar center a distance at least as great as the length of said block longitudinally of the bar, and bushings spanning said lugs at opposite ends thereof and extending through said alined holes therein to receive said pivot pins and distribute wear along the latter.

6. A link for a feed chain comprising an elongated bar providing a work supporting surface on one side thereof, a generally rectangular block rigid with the opposite side of said bar and extending transversely across the width of the latter with two of its ends projecting beyond opposite longitudinal side edges of the bar, said block being disposed adjacent but offset longitudinally from the longitudinal center of said bar toward one end of the latter and having a lateral surface adapted to cooperate with a guide, and a pair of parallel lugs extending transversely of said bar adjacent the other end thereof and projecting rigidly from said opposite bar side and equidistantly beyond said opposite side edges of the bar, said lugs being spaced apart longitudinally of said bar to receive the teeth of a drive sprocket between them with the lug adjacent said bar center spaced from the latter a distance equal to at least the length of said block measured longitudinally of the bar.

7. A link for a feed chain comprising an elongated bar providing a work supporting surface on one side thereof, a pair of lugs alined transversely of said bar and projecting rigidly from the opposite side thereof and equidistantly beyond opposite longitudinal side edges of the bar, said lugs being disposed adjacent but offset longitudinally from the longitudinal center of the bar toward one end of the latter and having lateral surfaces adapted to cooperate with a guide, and a second pair of lugs extending transversely of said bar adjacent the other end thereof and each projecting rigidly from said opposite side and equidistantly beyond said opposite side edges of the bar, said second lugs being spaced apart longitudinally of said bar to receive the teeth of a driving sprocket between them with the inner lug of the second pair spaced from the longitudinal center of the bar a distance at least as great as the length of the lugs of said first pair longitudinally of the bar.

THEODORE C. MANN.

REFERENCES CITED

The following references are of record in the file of this patent:

UNITED STATES PATENTS

| Number | Name | Date |
|---|---|---|
| 1,809,054 | Mattison | June 9, 1931 |
| 1,854,334 | Jensen et al. | Apr. 19, 1932 |
| 2,053,915 | Mattison | Sept. 8, 1934 |

FOREIGN PATENTS

| Number | Country | Date |
|---|---|---|
| 328,507 | Germany | Oct. 30, 1920 |